United States Patent Office 3,245,873
Patented Apr. 12, 1966

---

3,245,873
DIBROMO ALKYLANILINE NEMATOCIDE
Sidney B. Richter, Chicago, Ill., assignor to Velsicol Chemical Corporation, Chicago, Ill., a corporation of Illinois
No Drawing. Filed Apr. 28, 1965, Ser. No. 451,637
6 Claims. (Cl. 167—30)

This application is a continuation-in-part of my co-pending application Serial No. 232,884 filed October 24, 1962, now abandoned.

This invention relates to a method for the control of nematodes which comprises subjecting nematodes to the action of a compound of the general formula

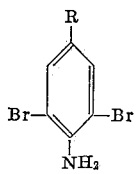

wherein R is lower unsubstituted alkyl. By lower alkyl is meant alkyl groups containing from one to four carbon atoms.

These compounds have been found to have marked activity against nematodes and are therefore useful in their control. While these compounds can be used in the form of the free amine as shown in the structural formula above, it is also within the scope of this invention that these compounds be used in the form of their salts such as the hydrochlorides, hydrobromides, hydroiodides, sulfates, acetates, and the like.

The compounds useful in the method of this invention are either known in the art or can be prepared readily by recognized techniques. For example, such compounds can be obtained by the bromination of the corresponding p-alkylanilines such as p-methylaniline, p-ethylaniline, p-propylaniline, p-isopropylaniline, p-butylaniline, and p-isobutylaniline. The bromine can be introduced by treatment with gaseous bromine, or by treatment with the bromine in a combined form such as iodine monobromide. Catalysts as known in the art can be used; and it is sometimes advantageous to block the free amine group with a substituent such as the acetyl group before proceeding with the bromination, the blocking group being removed subsequently by saponification. One alternative means of preparing the compounds useful in this invention comprises treating a monobrominated p-alkylaniline with further bromine to form the desired dibromo compound. The following examples serve to illustrate the manner in which useful compounds according to this invention can be prepared. All temperatures are in degrees centigrade.

EXAMPLE 1

*Preparation of 2,6-dibromo-p-tert-butylaniline*

This compound can be prepared by the method disclosed by L. Drake et al. in J. Am. Chem. Soc. 68, 1602–6 (1946), wherein 2-bromo-4-tert-butylaniline (58 g.; 0.26 mole) was treated dropwise at room temperature with bromine (43 g.; 0.27 mole) in 400 ml. of glacial acetic acid containing 10 ml. water. The mixture was stirred for one hr., poured into water, treated with sodium bisulfite to remove excess bromine, and extracted with benzene. The benzene extract was washed with sodium bicarbonate solution, dried, and distilled. Fractionation of the residue gave an 83% yield of 2,6-dibromo-p-tert-butylaniline, B.P. 136–140°/2 mm.

EXAMPLE 2

*Preparation of 2,6-dibromo-p-toluidine*

This compound can be prepared by the method of Lock and Schreckneder Ber. 72B, 511–517 (1939) wherein p-toluidine (53.5 grams; 0.5 mole) was placed in a glass reaction flask. Glacial acetic acid (250 ml.) was added to the flask. This solution was cooled to 10° C. by means of an external ice water bath. A bromine solution [bromine (52 ml.) and glacial acetic acid (50 ml.)] was slowly added with continuous stirring over a forty minute period. Stirring was continued for an additional 90 minutes. Then water (300 ml.) was added and the mixture was stirred for an additional 30 minutes. Additional water was added to the mixture increasing its volume to 2½ liters. It was then filtered. The filter cake was washed with water and allowed to dry. 130.1 grams of 2,6-dibromo-p-methylaniline, having a melting point of 71.5–75° C. was obtained. It was further purified by boiling it in ethanol and decolorizing charcoal. After drying, the product weighed 106.7 grams and had a melting point of 71–76° C. It was again purified by dissolving it in acetone and boiling the solution with decolorizing charcoal. Upon drying, the product weighed 84.5 grams and had a melting point of 71.5–77° C.

The other compounds in this invention can be prepared in the manner detailed in the above typical examples. In the following examples are given the starting compound as well as the bromine which can be used to prepare the indicated named compounds within the scope of this invention.

EXAMPLE 3 p-Butylaniline+bromine=2,6-dibromo-p-butylaniline

EXAMPLE 4 p-Ethylaniline+bromine=2,6-dibromo-p-ethylaniline

EXAMPLE 5 p-Isobutylaniline+bromine=
2,6-dibromo-p-isobutylaniline

EXAMPLE 6 p-Isopropylaniline+bromo=
2,6-dibromo-p-isopropylaniline

EXAMPLE 7 p-sec-Butylaniline+bromine=
2,6-dibromo-p-sec-butylaniline

EXAMPLE 8 p-Propylaniline+bromine=2,6-dibromo-p-propylaniline

Nematodes are tiny worms which cause extensive damage to many important commercial plants. Although they can attack any part of the plant, most species limit their attack to the roots or other underground parts. They injure plants by direct feeding, by causing root loss and general stunting, and in an indirect manner by injuring the tissues and making the plants more susceptible to fungus diseases. The presently known control measures include crop rotation, other cultural practices, and soil treatment with chemicals; but none of these methods has been fully satisfactory. Indeed, such important nematode species as the wheat nematode, the stem and bulb nematode, the burrowing nematode, the root nematode, the citrus nematode, the sugar beet nematode, the root knot nematode, the meadow nematode, the potato rot nematode, and the golden nematode continue to cause heavy damage to many economic crops. An effective means for the control of such nematodes is therefore highly desirable.

For practical use as nematocides, the compounds in this invention are generally incorporated into nematocidal compositions which comprise an inert carrier and a nematocidally toxic amount of such a compound. Such compositions, which are usually known in the art as formulations, enable the active compound to be applied conveniently to the site of the nematode infestation in any desired quantity. These compositions can be solids such as dusts, granules, or wettable powders; or they can be liquids such as solutions or emulsifiable concentrates.

For example, dusts can be prepared by grinding and bending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions can be dispersed under superatmospheric pressure as aerosols. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the nematode infestation. The emulsifiers most commonly used in these concentrates are nonionic or mixtures of nonionic with anionic surface-active agents.

A typical composition according to this invention is illustrated by the following examples, in which the quantities are in parts by weight.

EXAMPLE 9

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the nematode infestation.

EXAMPLE 10

Preparation of an emulsifiable concentrate

The following ingredients are blended thoroughly until a homogenous liquid concentrate is obtained. This concentrate is mixed with water to give an aqueous dispersion containing the desired concentration of active compound for use as a spray.

2,6-dibromo-p-toluidine _____ 25
Sodium lauryl sulfate _____ 2
Sodium lignin sulfonate _____ 3
Kerosene _____ 70

EXAMPLE 11

Preparation of a wettable powder

The following components are mixed intimately in conventional mixing or blending equipment and are then ground to a powder having an average particle size of less than about 50 microns. The finished powder is dispersed in water to give the desired concentration of active compound.

2,6-dibromo-p-ethylaniline _____ 75.00
Fuller's earth _____ 22.75
Sodium lauryl sulfate _____ 2.00
Methyl cellulose _____ .25

EXAMPLE 12

Preparation of an oil-dispersible powder

The following components are blended and ground as described in the previous example to give a powder which can be dispersed in oil to form a spray containing the desired concentration of active compound.

2,6-dibromo-p-butylaniline _____ 70
Condensation product of diamylphenol with ethylene oxide _____ 4
Fuller's earth _____ 26

EXAMPLE 13

Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

2,6-dibromo-p-isopropylaniline _____ 10
Fuller's earth _____ 66
Dextrin _____ 20
Sodium lignin sulfonate _____ 3
Kerosene _____ 1

The nematocides in this invention can be applied in any manner recognized by the art. The concentration of the compounds of this invention in the compositions will vary greatly with the type of formulation and the purpose for which it is designed, but generally the compositions will comprise from about 0.05 to about 95 percent by weight of the active compounds. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The toxicity of the compounds in this invention to nematodes can be shown by a variety of testing techniques known to the art. For example, in one series of tests, compounds were tested for control of the root knot nematode (Meloidogyne spp.) on tomato. The nematodes were reared in tomato plant-soil culture, in which soil for the test purposes was inoculated with infected soil and root knots from infected tomato plants.

The test compound was formulated as a dust and blended thoroughly with the soil in a mechanical blender at the rate of 0.41 g./gal. of soil, which is equivalent to 100 lbs. of chemical per acre (4 inch depth). For one-pint paper pots were used for each treatment with one tomato transplant per pot. After three to four weeks under artificial lighting and overhead irrigation, the roots of the plants were examined for degree of root knot formation. In these experiments, the compound 2,6-dibromo-p-toluidine gave 100% control of the nematode; while the untreated controls had 80 to 100 root knots per plant. This compound also gave 100% control at a rate of 50 lbs./4-inch acre. The compound gave 90% control at a rate of 16.4 lbs./4-inch acre.

In addition 2,6-dibromo-p-toluidine was evaluated by the foregoing procedure for control of clover cyst nematode (*Heterodera trifolu*) on white clover. The test compound was applied at a rate of 16.4 lbs./4-inch acre. In this experiment, 2,6-dibromo-p-toluidine gave 93.8% control of the clover cyst nematode.

What is claimed is:
1. The method for the control of nematodes which comprises subjecting nematodes to the action of an effective amount of a compound of the formula

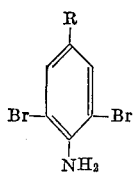

wherein R is lower unsubstituted alkyl.

2. The method of claim 1, wherein the compound is 2,6-dibromo-p-toluidine.

3. The method of claim 1, wherein the compound is 2,6-dibromo-p-ethylaniline.

4. The method of claim 1, wherein the compound is 2,6-dibromo-p-propylaniline.

5. The method of claim 1, wherein the compound is 2,6-dibromo-p-isopropylaniline.

6. The method of claim 1, wherein the compound is 2,6-dibromo-p-butylaniline.

References Cited by the Examiner
UNITED STATES PATENTS

| | | | |
|---|---|---|---|
| 3,027,297 | 3/1962 | Wotiz | 167—30 |
| 3,037,058 | 5/1962 | Bluestone | 167—30 |

JULIAN S. LEVITT, *Primary Examiner.*

J. D. GOLDBERG, *Assistant Examiner.*